United States Patent Office 3,429,888
Patented Feb. 25, 1969

3,429,888
TETRAHYDRONAPHTHALENE DERIVATIVES
Alexander D. Cross, Mexico City, Mexico, assignor to Syntex Corporation, Panama, Panama, a corporation of Panama
No Drawing. Filed Aug. 22, 1966, Ser. No. 573,803
U.S. Cl. 260—294.7                                10 Claims
Int. Cl. C07d 29/20, 29/24, 49/54

ABSTRACT OF THE DISCLOSURE

This invention is directed to novel compounds of the formula:

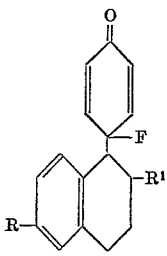

wherein R is hydrogen, lower alkoxy, diloweralkylaminoethoxy or piperidinoethoxy, $R^1$ is phenyl, halophenyl, loweralkylphenyl, and loweralkoxyphenyl. The compounds are useful as estrogenic agents.

---

This invention relates to novel tetrahydronaphthalene derivatives.

More particularly, the present invention relates to novel tetrahydronaphthalene derivatives of the following formula:

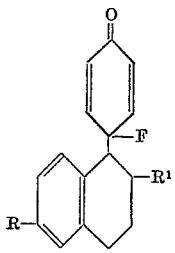

wherein R is hydrogen, lower alkoxy, diloweralkylaminoethoxy, or piperidinoethoxy, and the acid addition salts thereof, e.g., the citrate, $R^1$ is selected from the group consisting of phenyl, chlorophenyl, fluorophenyl, lower alkylphenyl, and lower alkoxyphenyl. The chloro, fluoro, lower alkyl, lower alkoxy substituent of the phenyl radical can be in the meta, ortho or para position of the phenyl radical, preferably in the para position.

The lower alkyl and lower alkoxy groups of the compounds of the present invention contain from 1 to about 6 carbon atoms and may be of a straight, or branched structure. Typical groups include methyl, ethyl, n-propyl, isopropyl, n-pentyl, isobutyl, and the like and the corresponding alkoxy groups.

The novel compounds of the present invention are prepared from a 1,2-diaryl-1,2,3,4-tetrahydronaphthalene according to the following outlined process.

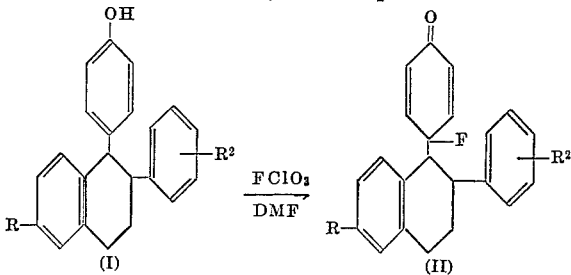

In the above formulas, R is as defined above and $R^2$ is hydrogen, chloro, fluoro, lower alkyl or lower alkoxy.

In practicing the above outlined process, the starting material I, a 1-(p-hydroxyphenyl)-2-(aryl)-tetrahydronaphthalene is treated with at least an equimolar amount of perchloryl fluoride, preferably a molar excess, by introducing a stream of perchloryl fluoride into a mixture of the starting material I and an inert organic solvent such as dimethylformamide, or the like, to furnish the novel 1 - (1'-fluorocyclohexa-2',5'-dien-4'-one) derivative II. The reaction is generally conducted at about room temperature, higher and lower temperatures can also be used. The reaction is usually complete in from about 12 to 24 hours, depending upon such factors as the reaction temperature, amount of starting material, rate of introducing the gaseous perchloryl fluoride, concentration, and the like.

The presence of asymmetric carbon atoms in the compounds of the present invention permits the existence of optical isomers. The optical isomers are encompassed by the present invention.

The compounds of Formula I used as the starting material for the preparation of the novel compounds of the present invention can be obtained from the appropriately substituted 1-tetralone, 3,4-dihydro-1,2-diarylnaphthalene, 1-hydroxy-2-aryl-1,2,3,4-tetrahydronaphthalene, or the like according to the procedure of Bencze et al., Experientia 21, 261 (1965), Carney et al., J. Med. Chem. 9, 516–520 (1966), and Lednicer et al., J. Med. Chem. 9, 172–176 (1966).

The novel compounds of the present invention and mixtures thereof possess valuable physiological properties. They are useful as estrogenic agents in the same manner as known steroidal estrogens, such as estradiol, e.g., in veterinary medicine for the control and regulation of fertility. They can be administered in conjunction with pharmaceutically acceptable excipients in the same manner and at the same dosage level, or lower, used heretofore for known steroidal estrogenic agents.

The following detailed examples are provided to illustrate the present invention.

Example 1

One gram of 1-(p-hydroxyphenyl)-2-(p-chlorophenyl)-6-methoxy-1,2,3,4-tetrahydronaphthalene in 50 ml. of dimethylformamide is treated at room temperature with a rapid stream of perchloryl fluoride for 0.5 hour and then with a very slow stream of the gas sufficient to maintain a saturated solution overnight (about 16 hours). The solution is then poured into dilute aqueous sodium bicarbonate, extracted with methylene chloride, and separated. The methylene chloride extract is then chromatographed over alumina. Elution with benzene followed by crystallization from acetone-hexane to furnish 1 - (1'-fluoro-cyclohexa-2',5'-dien-4'-one) - 2 - (p-chlorophenyl)-6-methoxy-1,2,3,4-tetrahydronaphthalene.

By repeating the process of this example using as the starting material, other 1-(p-hydroxyphenyl)-2-(aryl or substituted aryl)-1,2,3,4-tetrahydronaphthalenes, e.g. 1-(p-hydroxyphenyl) - 2-(p-fluorophenyl)-6-methoxy-1,2,3, 4-tetrahydronaphthalene, 1-(p-hydroxyphenyl)-2-(p-chlorophenyl) - 6 - (2'-dimethylaminoethoxy) - 1,2,3,4 - tetrahydronaphthalene, 1 - (p-hydroxyphenyl)-2-(p-chlorophenyl) - 6 - (2'-piperidinoethoxy) - 1,2,3,4 - tetrahydronaphthalene, and the like, in place of 1-(p-hydroxyphenyl) - 2 - (p-chlorophenyl) - 6 - methoxy - 1,2,3,4-tetrahydronaphthalene, there is obtained the corresponding 1-(1'-fluoro-cyclohexa-2',5'-dien-4'-one) derivative.

Example 2

A solution of 5 g. of 1-oxo-2-(p-chlorophenyl)-6-methoxy-1,2,3,4-tetrahydronaphthalene in 250 ml. of thiophene-free benzene is treated with an equimolar amount of p-(tetrahydropyran-2'-yloxy) phenylmagnesium bromide in anhydrous tetrahydrofuran. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 1α-hydroxy-1β - [p - (tetrahydropyran-2'-yloxy)phenyl]-2 - (p-chlorophenyl) - 6-methoxy-1,2,3,4-tetrahydronaphthalene.

A solution of 2 g. of the above-prepared compound in 100 ml. of ethyl acetate is hydrogenated with 0.1 g. of platinum oxide catalyst until the theoretical amount of hydrogen is consumed. The catalyst is removed by filtration and the filtrate is evaporated to dryness to yield 1β-[p-(tetrahydropyran - 2' - yloxy)phenyl]-2α-(p-chlorophenyl)-6-methoxy-1,2,3,4-tetrahydronaphthalene.

To a solution of 1 g. of the thus-obtained compound in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 1β-(p-hydroxyphenyl)-2α-(p-chlorophenyl) - 6-methoxy-1,2,3,4-tetrahydronaphthalene.

By repeating the process of this example, using 1-oxo-2-(p-chlorophenyl)-1,2,3,4-tetrahydronaphthalene,
1-oxo-2-(p-fluorophenyl)-6-methoxy-1,2,3,4-tetrahydronaphthalene,
1-oxo-2-(p-methylphenyl)-6-methoxy-1,2,3,4-tetrahydronaphthalene,
1-oxo-2-phenyl-6-methoxy-1,2,3,4-tetrahydronaphthalene,
1-oxo-2-(p-chlorophenyl)-6-(2'-dimethylaminoethoxy)-1,2,3,4-tetrahydronaphthalene,
1-oxo-2-(p-fluorophenyl)-6-(2'-dimethylaminoethoxy)-1,2,3,4-tetrahydronaphthalene,
1-oxo-2-(p-methylphenyl)-6-(2'-dimethylaminoethoxy)-1,2,3,4-tetrahydronaphthalene,
1-oxo-2-(p-chlorophenyl)-6-piperidinoethoxy-1,2,3,4-tetrahydronaphthalene,
1-oxo-2-(p-fluorophenyl)-6-piperidinoethoxy-1,2,3,4-tetrahydronaphthalene,
1-oxo-2-(p-methylphenyl)-1,2,3,4-tetrahydronaphthalene, and the like in place of 1-oxo-2-(p-chlorophenyl)-6-methoxy-1,2,3,4-tetrahydronaphthalene, the corresponding 1β-(p-hydroxyphenyl)-2α-(aryl)-tetrahydronaphthalene derivative is obtained, i.e.

1β-(p-hydroxyphenyl)-2α-(p-chlorophenyl)-1,2,3,4-tetrahydronaphthalene,
1β-(p-hydroxyphenyl)-2α-(p-fluorophenyl)-6-methoxy-1,2,3,4-tetrahydronaphthalene,
1β-(p-hydroxyphenyl)-2α-(p-methylphenyl)-6-methoxy-1,2,3,4-tetrahydronaphthalene,
1β-(p-hydroxyphenyl)-2α-phenyl-6-methoxy-1,2,3,4-tetrahydronaphthalene,
1β-(p-hydroxyphenyl)-2α-(p-chlorophenyl)-6-(2'-dimethylaminoethoxy)-1,2,3,4-tetrahydronaphthalene, and the like.

The starting materials employed in this example having a dialkylaminoethoxy or piperidinoethoxy substituent at position 6 of the tetrahydronaphthalene nucleus can be prepared from the corresponding hydroxy compound by procedures known in the art, e.g., by alkylation with a β-chloroethylamine in methanol containing sodium methoxide. Thus, the alkylation of the hydroxy compound can be effected by treating the sodium salt with β-chloroethyldialkylamine or β-chloroethylpiperidine which can be obtained according to the procedure of Breslow et al., J.A.C.S., 67, 1472 (1945).

To a solution of 3 g. of 2-(p-chlorophenyl)-6-hydroxy-1-tetralone and 2 g. of potassium carbonate in 50 ml. of acetone is added 2 g. of 1-dimethylamino-2-chloroethane. The mixture is heated at reflux for 24 hours, cooled and evaporated. Recrystallization of the residue from acetone-hexane furnishes 2-(p-chlorophenyl)-6-(2'-dimethylaminoethoxy)-1-tetralone.

Example 3

One gram of the trans isomer, 1β-(p-hydroxyphenyl)-2α-(p - chlorophenyl)-6-methoxy-1,2,3,4-tetrahydronaphthalene in 50 ml. of dimethylformamide is treated at room temperature with a rapid stream of perchloryl fluoride for 0.5 hour and then with a very slow stream of the gas sufficient to maintain a saturated solution overnight (about 16 hours). The solution is then poured into dilute aqueous sodium bicarbonate, extracted with methylene chloride, and separated. The methylene chloride extract is then chromatographed over alumina. Elution with benzene followed by crystallization from acetone-hexane furnishes 1β-(1'α-fluorocyclohexa-2',5'-dien-4'-4'-one)-2α-(p-chlorophenyl) - 6 - methoxy-1,2,3,4-tetrahydronaphthalene and 1β-(1'β-fluoro-cyclohexa-2',5'-dien-4'-one)-2α-(p - chlorophenyl)-6-methoxy-1,2,3,4-tetrahydronaphthalene.

By repeating the process of this example using as the starting material the other 1β-(p-hydroxyphenyl)-2α-(aryl and substituted aryl)-tetrahydronaphthalene compounds of Example 2 in place of 1β-(p-hydroxyphenyl)-2α-(p - chlorophenyl)-6-methoxy-1,2,3,4-tetrahydronaphthalene, the corresponding 1β-(1'α-fluoro-cyclohexa-2',5'-dien-4'-one)- and 1β-(1'β-fluoro-cyclohexa-2',5'-dien-4'-one)-(aryl and substituted aryl) tetrahydronaphthalene compounds are obtained, e.g. 1β-(1'α-fluoro-cyclohexa-2',5'-dien-4'-one) - 2α - (p-chlorophenyl)-1,2,3,4-tetrahydronaphthalene and 1'β-fluoro isomer, 1β-(1'α-fluoro-cyclohexa-2',5'-dien-4'-one) - 2α - (p-fluorophenyl)-6-methoxy-1,2,3,4-tetrahydronaphthalene and the 1'β-fluoro isomer, 1β-(1'α-fluoro-cyclohexa-2',5'-dien-4'-one)-2α-(p-methylphenyl) - 6-methoxy-1,2,3,4-tetrahydronaphthalene and the 1'β-fluoro isomer, and the like.

One gram of 1β-(1'α-fluoro-cyclohexa-2',5'-dien-4'-one)-2α-(p-chlorophenyl)-6-(2' - dimethylaminoethoxy)-1,2,3,4-tetrahydronaphthalene is dissolved in ether and an equimolar amount of citric acid in ether is added to the solution. Then the product formed is collected and purified from a mixture of ethanol and ether to give the citrate of 1β-(1α-fluoro - cyclohexa-2',5'-dien-4'-one)-2α-(p-chlorophenyl) - 6 - (2'-dimethylaminoethoxy)-1,2,3,4-tetrahydronaphthalene.

Similarly, by the use of other inorganic and organic acids in place of citric acid, other pharmaceutically acceptable acid addition salts can be obtained.

Example 4

One gram of the cis isomer, 1β-(p-hydroxyphenyl)-2β-(p - chlorophenyl) - 6 - methoxy - 1,2,3,4 - tetrahydronaphthalene in 60 ml. of dimethylformamide is treated at about 25° C. with a rapid stream of perchloryl fluoride for about 0.5 hour and then with a very slow stream of the gas sufficient to maintain a saturated solution overnight (about 14 hours). The solution is then poured into dilute aqueous sodium bicarbonate, extracted with methylene chloride, and separated. The methylene chloride extract is then chromatographed over alumina. Elution with benzene followed by crystallization from acetone-hexane furnishes 1β-(1'α-fluorocyclohexa-2',5'-dien-4'-one) - 2β - (p - chlorophenyl - 6-methoxy - 1,2,3,4 - tetrahydronaphthalene and 1β-(1'β-fluoro-cyclohexa-2',5'-dien-4' - one) - 2β - (p - chlorophenyl) - 1,2,3,4 - tetrahydronaphthalene.

By repeating the process of this example using in place of 1β-(p-hydroxyphenyl)-2β-(p-chlorophenyl)-6- methoxy-1,2,3,4-tetrahydronaphthalene, the following starting materials:

1β-(p-hydroxyphenyl)-2β-(p-chlorophenyl)-6-(2'-dimethylaminoethoxy)-1,2,3,4-tetrahydronaphthalene,
1β-(p-hydroxyphenyl)-2β-(p-fluorophenyl)-6-methoxy-1,2,3,4-tetrahydronaphthalene,
1β-(p-hydroxyphenyl)-2β-(p-methylphenyl)-6-methoxy-1,2,3,4-tetrahydronaphthalene,
1β-(p-hydroxyphenyl)-2β-(p-fluorophenyl)-6-(2'-dimethylaminoethoxy)-1,2,3,4-tetrahydronaphthalene,
1β-(p-hydroxyphenyl)-2β-(p-chlorophenyl)-6-piperidinoethoxy-1,2,3,4-tetrahydronaphthalene,
1β-(p-hydroxyphenyl)-2β-(p-chlorophenyl)-1,2,3,4-tetrahydronaphthalene,
1β-(p-hydroxyphenyl)-2β-phenyl-1,2,3,4-tetrahydronaphthalene and the like, there is obtained the corresponding 1β-(1'α-fluoro-cyclohexa-2',5'-dien-4'-one) and
1β-(1'β-fluoro-cyclohexa-2',5'-dien-4'-one)-isomers.

What is claimed is:
1. A novel tetrahydronaphthalene derivative of the formula

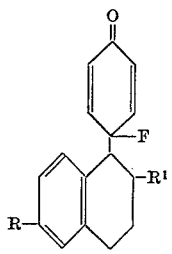

wherein R is selected from the group consisting of hydrogen, lower alkoxy, lower dialkylaminoethoxy and piperidinoethoxy and R¹ is selected from the group consisting of phenyl, chlorophenyl, fluorophenyl, lower alkylphenyl, and lower alkoxyphenyl.

2. A compound according to claim 1 wherein R is methoxy and $R^1$ is p-chlorophenyl.
3. A compound according to claim 1 wherein R is methoxy and $R^1$ is p-fluorophenyl.
4. A compound according to claim 1 wherein R is methoxy and $R^1$ is p-methylphenyl.
5. A compound according to claim 1 wherein R is dimethylaminoethoxy and $R^1$ is p-chlorophenyl.
6. A compound according to claim 1 wherein R is dimethylaminoethoxy and $R^1$ is p-fluorophenyl.
7. A compound according to claim 1 wherein R is dimethylaminoethoxy and $R^1$ is p-methylphenyl.
8. A compound according to claim 1 wherein R is piperidinoethoxy and $R^1$ is p-chlorophenyl.
9. A compound according to claim 1 wherein R is piperidinoethoxy and $R^1$ is p-fluorophenyl.
10. A compound according to claim 1 wherein R is piperidinoethoxy and $R^1$ is p-methylphenyl.

References Cited

UNITED STATES PATENTS 3,304,308  2/1967  Bencze _____ 260—294.7

HENRY R. JILES, *Primary Examiner.*

R. T. BOND, *Assistant Examiner.*

U.S. Cl. X.R.

260—590, 570.7, 999